United States Patent [19]

Sherman

[11] 4,335,862

[45] Jun. 22, 1982

[54] MOD FLAP MOUNTING DEVICE

[76] Inventor: Robert F. Sherman, 397 First St., Brooklyn, N.Y. 11215

[21] Appl. No.: 108,411

[22] Filed: Dec. 31, 1979

[51] Int. Cl.³ .............................................. E04G 3/00
[52] U.S. Cl. .................................. 248/289.1; 248/478
[58] Field of Search ............................. 248/289.1, 478

[56] References Cited

U.S. PATENT DOCUMENTS

| | | | |
|---|---|---|---|
| 1,179,286 | 4/1916 | Crimmel | 248/289.1 |
| 1,821,722 | 9/1931 | Neal | 248/289.1 |
| 2,488,316 | 11/1949 | Mosby | 248/289.1 |
| 2,707,229 | 4/1955 | Breithaupt | 248/289.1 |

Primary Examiner—Wayne L. Shedd
Attorney, Agent, or Firm—Ronald G. Cummings

[57] ABSTRACT

A mud flap mounting device for use with a tractor trailer truck is disclosed comprising a frame member adapted for attachment to the tractor truck and having an upper surface with a trough therein, a generally L-shaped support rod having a first leg adapted for attachment to a mud flap and a second leg rotatably mounted to the frame member to rotate between a first position wherein the mud flap is adjacent a wheel to a second position 180° therefrom, and biasing means for yieldably maintaining the support rod in the first position and alternatively in the second position.

17 Claims, 6 Drawing Figures

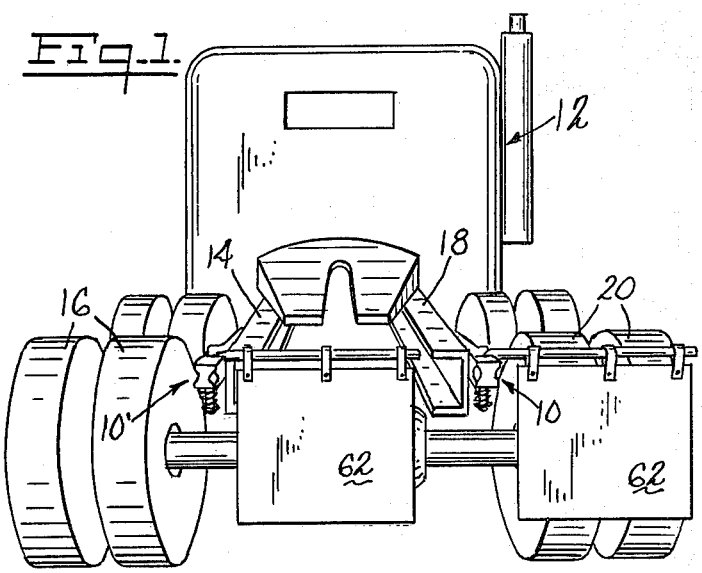
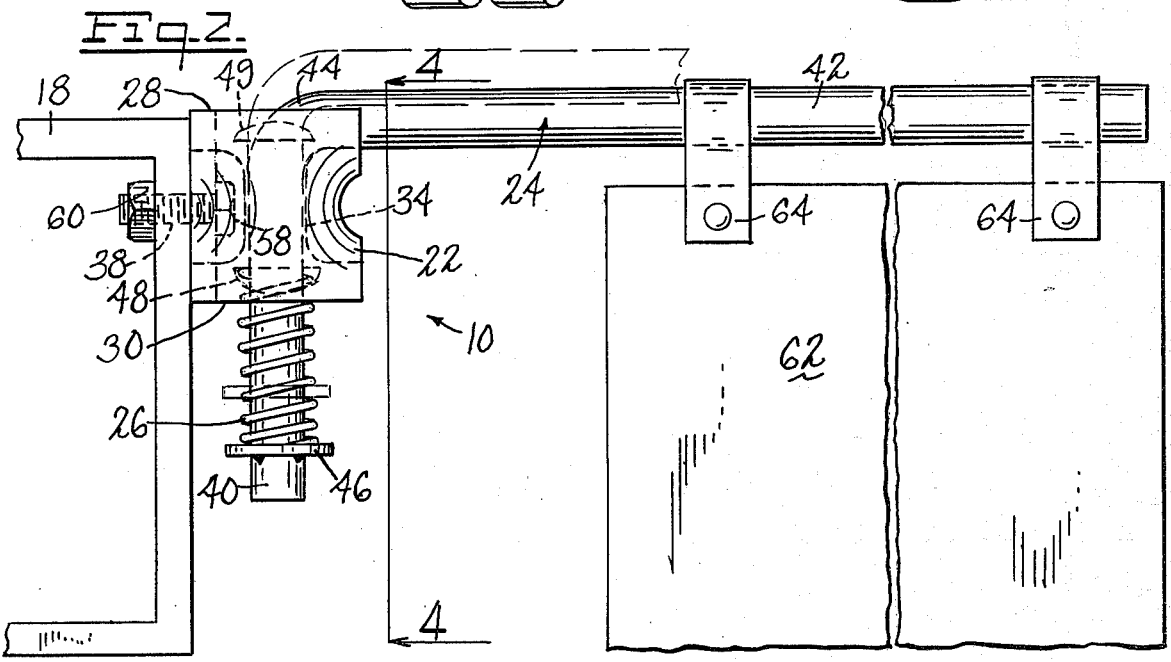
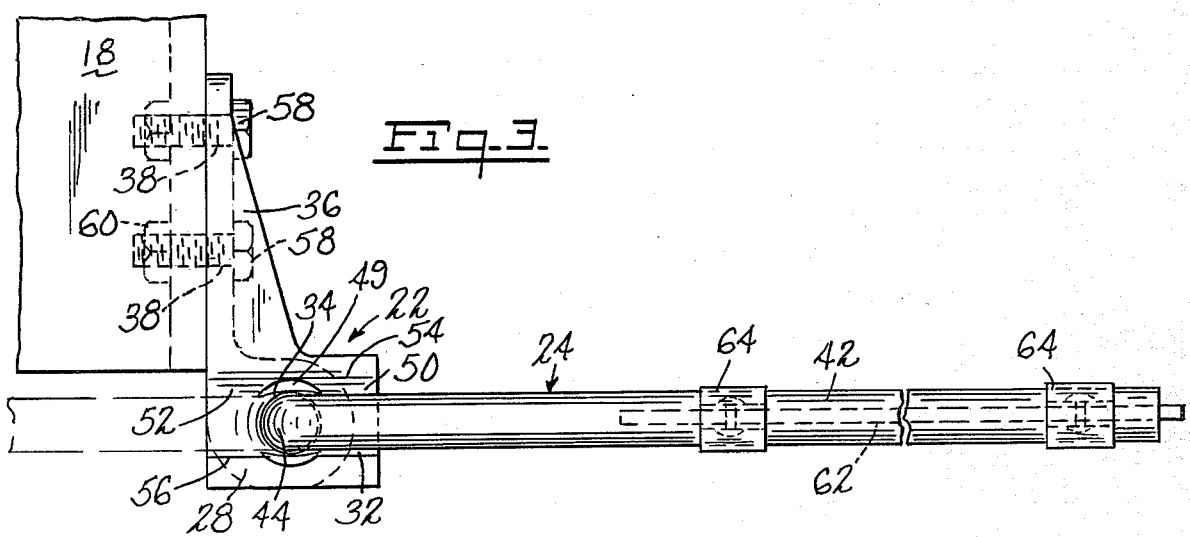

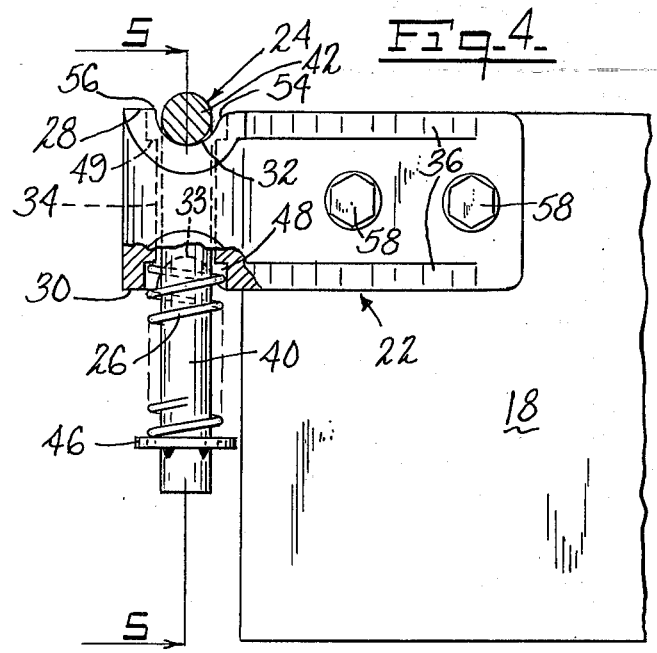
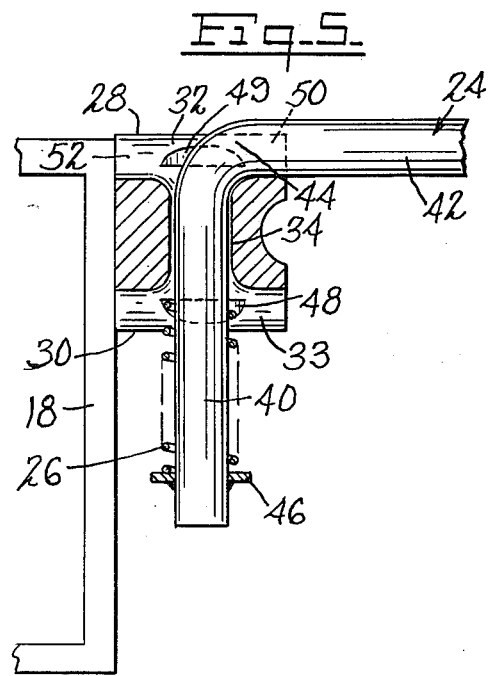
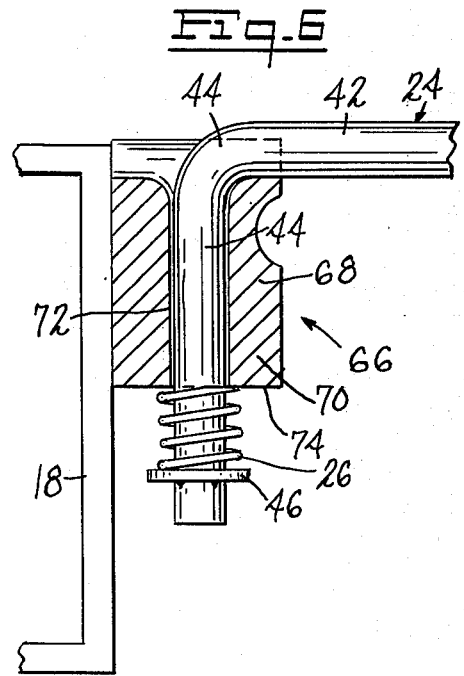

MOD FLAP MOUNTING DEVICE

BACKGROUND OF THE INVENTION

This invention relates to a mud flap mounting device, and more particularly to a rotatable mud flap mounting device for use with tractor trailer trucks.

Prior mud flap mounting assemblies were susceptible to damage and breakage. Damage to the mounting assembly was frequently encountered when the mud flap assembly came into contact with the support legs of the trailer during the maneuvering of the vehicle. This contact or entanglement would especially occur when the angle between the motorized cab and trailer approached 90° or more. Damage to the mud flap mounting assembly also occurs when the vehicle backs up over curbs or other uneven terrain and the mud flap itself gets caught between an obstacle and the tires of the vehicle. This entanglement of the mud flap causes force on the mounting assembly that results in damage or loss of the assembly. The fraility of prior mounting assemblies also contributed to the susceptibility to damage.

Prior mounting assemblies also did not provide a rigid support for the mud flap and, accordingly, exhibited vibration and sway. This vibration or sway eventually weakened the assembly so as to be more susceptible to damage upon contact with obstacles or the support legs of the trailer.

Some prior mounting assemblies provided removable mud flap support arms to allow detachment when a trailer is connected to the motorized cab and mud flaps are not required. Detachable parts, however, are susceptible to loss and possible dislodgement due to vibration.

SUMMARY OF THE INVENTION

A mud flap mounting assembly is disclosed comprising a frame member adapted for attachment to a vehicle and having an upper surface with a trough or recess portion, a generally L-shaped support rod having a first leg adapted for attachment to a mud flap and a second leg rotatably mounted to the frame member to rotate between a first position wherein the mud flap is directly behind the truck wheel and a second position wherein the mud flap is remote from the wheel, and a biasing spring for yieldably maintaining the support rod in the first position or alternatively in the second position. The second leg of the support rod is rotatably mounted within a bore in the frame member such that a portion of the first leg supporting the mud flap resides in the trough for strength and stability. The biasing spring connects the support rod to the frame member to ridigly and yieldably maintain the first leg in the trough. The leading edge of the trough is cambered to allow the first leg to releasably break out of the trough should an obstacle be encountered.

It is a principal object of this invention to provide an improved mud flap mounting device.

A further object of the invention is to provide a mud flap mounting device that is sturdy in construction for use with tractor trailer trucks.

A still further object of the invention is to provide a mud flap mounting device that is rotatable from an operating position aft of the tire to a transport position remote from the tire.

A still further object of the invention is to provide a spring-loaded rotatable mud flap mounting device that spring biases the flap in the operating position or the transport position.

A still further object of the invention is to provide a non-separable mud flap mounting assembly.

A still further object of the invention is to provide a mud flap mounting assembly that is yieldable to contact in the operating position.

A still further object of the invention is to provide a mud flap mounting device that rigidly supports a mud flap without sway or vibration.

A still futher object of the invention is to provide a mud flap mounting device that is economical to manufacture, durable in use and refined in appearance.

BRIEF DESCRIPTION OF THE DRAWINGS

FIG. 1 is a prospective view of the invention mounted to the motorized cab of a trailer truck;

FIG. 2 is a partially broken away side view of the invention;

FIG. 3 is a top view of the device of FIG. 2;

FIG. 4 is a partially broken away sectional view seen on line 4—4 of FIG. 2;

FIG. 5 is a sectional view seen on line 5—5 of FIG. 4; and

FIG. 6 is a section view similar to FIG. 5 of an alternate embodiment.

DESCRIPTION OF THE PREFERRED EMBODIMENT

The mud flap mounting device of this invention is generally designated by the numeral 10 (FIG. 2) and is shown mounted to a conventional trailer truck 12 in FIG. 1.

In FIG. 1, a mounting device 10' is attached to frame rail 14 adjacent wheels 16 and a corresponding mounting device 10 is attached to frame rail 18 adjacent wheels 20. Mounting device 10 is shown in the "operating" position, while mounting device 10' is shown in the "transport" position. In accordance with highway requirements, a trailer truck without an attached trailer is required to use mud flaps on the dual rear wheels to protect following vehicles from spray or debris from the tires as exemplified by the position of mounting device 10. When a trailer is connected to truck 12, mud flaps are not required and are therefore rotated to the transport position as exemplified by the position of mounting device 10' as will be explained in greater detail subsequently. Mounting device 10 is the "mirror image" of mounting device 10' with device 10 being adapted for mounting on the passenger's side and device 10' being adapted for mounting on the driver's side. Therefore, description and explanation will be limited to device 10.

Mounting device 10 comprises frame member 22, support rod 24, and a spring or biasing means 26.

Frame member 22 is preferably of cast metal construction and has an upper surface 28 and lower surface 30 with a recess or trough 32 contained in upper surface 28 (FIG. 4). A bore 34 extends between upper surface 28 and lower surface 30. Securement brace 36 is an integral part of frame member 22 and extends transversely with respect to bore 34. Base 36 contains bolt-receiving apertures 38 to facilitate attachment to the frame rails as shown in FIG. 4 with recess 32 disposed rearward of rail 18.

Support rod 24 is generally an L-shaped rod preferably of solid construction and having a downwardly extending leg 40, a transverse leg 42 and an arcuate portion 44 connecting leg 40 and leg 42 (FIGS. 2 and 5) with leg 42 being of sufficient length to support a mud flap behind the dual tires (FIG. 1). Leg 40 is slidably received within bore 34 so as to be rotatably mounted therein. Trough 32 is positioned orthogonally with respect to bore 34 and extends transversely to upper surface 28 as shown in FIG. 3. Arcuate portion 44 and a portion of leg 42 are contained in trough 32 to provide support, stability, and protection to support rod 24. Since the bend of the rod, i.e., arcuate portion 44, is considered the weakest part of the rod, substantially encompassing the bend in trough 32 supports and protects this weak point from undue strain and shock.

Annular flange 46 is securely attached by welding or the like to downwardly extending leg 40. Spring 26 is an expansion-type spring mounted concentrically about leg 40 between flange 46 and frame member 22. Lower surface 30 of frame 22 contains a recess 48 to receive and seat one end of spring 26. Therefore, spring 26 pushes against flange 46 and frame member 22 to pull and thereby bias leg 42 into trough 32. Spring 26 is preferably of sufficient expansive force to maintain leg 42 in trough 32 during the extreme vibration incurred in tractor trailer movement, yet allow manual rotation from the operable position to the transport position.

For purposes of explanation, trough 32 is considered to be divided into an end portion 50 and an end portion 52 (FIG. 3). Leg 42 is received in end portion 50 when mounting device 10 is in the operating position. Conversely, leg 42 is received in end portion 52 when support rod 24 is rotated clockwise into the transport position as illustrated in phantom in FIG. 3. It is preferred that end portion 50 and end portion 52 be in linear alignment, although other respective orientations may be utilized.

As shown in FIG. 4, trough 32 adjoins upper surface 28 at edges 54 and 56. When mounted to the frame rail 18, edge 54 is the leading edge and edge 56 is the following edge. Edge 54 is cambered or beveled to allow leg 42 to more easily ride over edge 54 in the event of unexpected forward force on mounting device 10. As shown in FIGS. 2, 4, and 5, recess 32 is of a depth to encompass more than one-half of the transverse dimension of rod 24.

Mounting device 10 is securely attached to frame rail 18 by bolts 58 and nuts 60 as shown in FIG. 3. Mud flap 62 is attached to leg 42 by means of mounting clips 64. Mounting clips 64 securely attach mud flap 62 to arm 42, yet allow mud flap 62 to freely pivot about the longitudinal axis of arm 42.

When trailer truck 12 is to be used without a hitched trailer, leg 42 is positioned such that mud flap 62 is located directly behind dual wheels 20. Spring 26 will maintain arcuate portion 44 and leg 42 securely in end portion 50 of trough 32. The biasing force of spring 26 together with the support leg 40 receives from bore 34 provides a sturdy, stable mud flap support assembly that is resistant to sway and vibration during travel. In the event that leg 42 should strike an obstacle while the truck is going in a reverse direction or the mud flap should become entangled, arm 42 will "break away" or yield its position in trough 32 and slide over cambered edge 54 to prevent damage to the mounting assembly. A predetermined amount of force upon arm 42 is necessary to overcome the biasing force of spring 26 and the frictional force of arm 42 relative to trough 32 and cambered edge 54.

The position of arcuate portion 44 in trough 32 provides additional support and strength to the weakest part of the rod, i.e., the bent portion. Thus, the possibility of damage to the mounting device is further reduced.

When truck 12 is to be utilized in hauling a trailer, mud flaps are not required and leg 42 is manually rotated clockwise 180° to assume the transport position shown by mounting device 10' in FIG. 1. In this position, mud flap 62 and mounting device 10' will not come in contact with the support legs or landing gear of the trailer and thus cannot be damaged during manuevering of the trailer. Again, spring 26 securely maintains leg 42 in end portion 52 of trough 32. The rotation of arm 42 from the operational position to the transport position does not involve the removal or withdrawal of any elements of the mounting device and thus, accidental loss is prevented. In the event the operator fails to rotate the mud flaps from the operating position to the transport position, cambered edge 54 will aid in reducing damage to the mounting device because of contact with the support legs.

Since mounting device 10' is the "mirror image" of mounting device 10, economy in manufacturing is obtained by casting frame member 22 with a trough 33 in lower surface 30 approximately parallel to trough 32 in upper surface 28. Likewise, a spring recess 49 is cast in upper surface 28. This allows the same casting of frame member 22 to be utilized on either the driver's or passenger's side of the vehicle by just reversing the orientation of support rod 24 and spring 26 during assembly.

An alternate embodiment is shown in FIG. 6 and generally designated by the numeral 66. Like elements are identified by prior numeral designations.

Frame member 68 of mounting device 66 comprises an elongated lower body portion 70. Bore 72 through frame member 68 is thus elongated compared to mounting device 10. The elongated bore 72 provides additional stability to leg 40 and leg 42 to further reduce sway or vibration. The lower surface 74 of frame member 68 does not have a trough therein and accordingly separate castings must be made for the driver's and passenger's side of the truck.

Thus, it can be seen that a durable, damage resistant mud flap assembly is disclosed that is easy to operate, economical to manufacture, and accomplishes at least all of its stated objectives.

What I claim is:

1. A mud flap mounting device for mounting a mud flap to the frame rail of a trailer truck comprising:
a frame member having an upper surface and forward and rearward end portions, said forward end portion having means to facilitate mounting to a frame rail so that said rearward end portion extends beyond the frame rail,
said upper surface having a recess located at said rearward end portion of said frame member so that said recess is positioned beyond the frame rail when said frame member is mounted to said frame rail, said recess having first and second end portions in approximately linear alignment,
a generally L-shaped support rod for attachment to a mud flap having a first leg, a second leg, and an arcuate portion therebetween, said support rod being rotatably mounted to said frame member to rotate approximately 180 degrees between first and second positions with said second leg received in said first end portion of said recess in said first position and received in said second end portion of said recess in said second position, said recess substantially encompassing said arcuate portion and being of a depth to encompass at least one-half of the transverse dimension of said second leg, and biasing means yieldably maintaining said support rod in said recess, said biasing means retaining said rod in said recess during trailer truck operation but allowing upward manual movement of said rod outwardly of said recess for manual rotation of said rod between said first and second positions.

2. The device of claim 1 wherein said frame member has a bore therein and said first leg of said support rod is rotatably mounted within said bore.

3. The device of claim 2 wherein said bore is orthogonal to said recess.

4. The device of claim 1 wherein:
said frame member has a bore therein,
said first leg has an annular flange and is rotatably mounted within said bore, and
said biasing means comprises an expansion spring mounted about said first leg, said spring being in contact with said annular flange and said frame member.

5. The device of claim 4 wherein said lower surface of said frame member has a recess to receive one end of said spring with the other end of said spring engaging said annular flange.

6. The device of claim 1 wherein:
first and second edges adjoin said recess and said upper surface of said frame member with said first edge portion being cambered for movement of said second leg over said cambered first edge portion in response to a forwardly directed force on said second leg of said support rod.

7. The device of claim 1 wherein said lower surface of said frame member has a recess therein.

8. The device of claim 7 wherein:
said recess portion of said upper surface is approximately parallel to said recess portion of said lower surface,
said frame member has a bore therethrough connecting said respective recess portions, and
said first leg of said support rod is rotatably mounted within said bore.

9. The device of claim 1 wherein said recess encompasses greater than one-half of said transverse dimension of said second leg.

10. The device of claim 1 wherein said frame member is of cast metal construction.

11. In combination,
a mud flap for dual trailer truck tires,
means for mounting said mud flap to a support rod,
a frame member having a forward mounting portion, a rearward pivot portion, and an upper surface, said mounting portion having means to facilitate mounting to a frame of a trailer truck so that said pivot portion extends beyond the frame rail, said upper surface having a recess at said rearward pivot portion so that said recess is positioned beyond the frame rail when said frame member is mounted to said frame rail, said recess having first and second portions in approximately linear alignment, a generally L-shaped support rod having a first leg, a second leg, and an arcuate portion therebetween, said second leg being of sufficient length to support said mud flap behind dual tires of a trailer truck, said mounting means mounting said mud flap to said second leg, said support rod being pivotably mounted to said rearward pivot portion of said frame member to rotate approximately 180 degrees between first and second positions with said second leg received in said first portion of said recess in said first position, and received in said second portion of said recess in said second position, said recess substantially encompassing said arcuate portion and being of a depth to encompass at least one-half the transverse dimension of said second leg, and biasing means yieldably maintaining said support rod in said recess, said biasing means retaining said rod in said recess during trailer truck operation but allowing upward manual movement of said rod outwardly of said recess for manual rotation of said rod between said first and second positions.

12. The combination of claim 11 wherein said frame member has a bore therein and said first leg of said support rod is rotatably mounted within said bore.

13. The combination of claim 12 wherein said bore is orthogonal to said recess.

14. The combination of claim 11 wherein:
said frame member has a bore therein,
said first leg has an annular flange and is rotatably mounted within said bore, and
said biasing means comprises an expansion spring mounted about said first leg, said spring being in contact with said annular flange and said frame member to bias said second leg in said recess portion.

15. The combination of claim 14 wherein said lower surface of said frame member has a recess to receive one end of said spring with the other end of said spring engaging said annular flange.

16. The combination of claim 11 wherein:
first and second edges adjoin said recess and said upper surface of said frame member with said first edge being cambered for movement of said second leg over said cambered first edge in response to a forwardly directed force on said second leg.

17. The combination of claim 11 wherein said mounting means comprises mounting clips.

* * * * *